Nov. 24, 1964  G. V. WOODLING  3,158,390

TAPERED THREAD FLUID SEAL CONNECTION

Filed Aug. 28, 1962

INVENTOR.
GEORGE V. WOODLING
BY
Woodling, Krost, Granger and Rust
attys.

United States Patent Office 3,158,390
Patented Nov. 24, 1964

3,158,390
TAPERED THREAD FLUID SEAL CONNECTION
George V. Woodling, 22077 W. Lake Road,
Rocky River, Ohio
Filed Aug. 28, 1962, Ser. No. 220,094
1 Claim. (Cl. 285—334)

My invention relates in general to tapered thread fluid seal connections and more particularly to pipe threads. It is well known in the art that pipe threads are subject to leakage when exposed to high fluid pressures. Efforts have been made to prevent this leakage, usually by the use of gaskets and O-rings, including the use of sealing paste material which is applied to the threads before they are screwed together. All of these prior methods have their drawbacks and very little has been done to improve the threads themselves to provide a fluid-tight seal under high pressures.

In high pressure hydraulic circuits, fluid pressure may reach as high as 10,000 to 20,000 p.s.i. Under these conditions, the previous methods employed, such as gaskets, O-rings and sealing paste material, are ineffective to seal these high pressures.

An object of my invention is to provide a means for effecting high pressure seals without the use of a gasket, O-ring and sealing paste material and by relying solely on the metal-to-metal contact between the male and female threads.

Another object of my invention is the provision of a tapered thread connection wherein the relationship and size of the male and female threads are such as to insure that the crest and root portions of the threads are forced to make a penetrating sealing engagement with each other to seal off any helical clearance therebetween before the threads make a flanking sealing engagement between their sides.

Another object is the provision of a tapered thread connection wherein the imperfect threads of the female member are removed to insure that resistance to rotation from a hand-tight make-up connection to a wrench-tight full make-up connection is effected only by engagement of full-size male and female threads with each other thereby eliminating any possible resistance to rotation which might have been created by engagement of the male threads with imperfect female threads.

Another object is the provision of a tapered thread connection wherein the relationship and size of the male and female threads are such that the torque resistance to rotation incident to the forcing of the crest and root portions of the threads together to make a penetrating sealing engagement with each other to seal off any helical clearance therebetween is less than the turning force of the operator by the use of a wrench.

Another object is to reduce the possibility of human error in making a perfect fluid seal connection in that an operator when turning prior art male and female members together may stop short of making a perfect fluid seal connection because the resistance to rotation which might be created by the engagement of the male threads with imperfect female threads to effect a wrench-tight full make-up connection may give the operator a false indication that a true fluid seal connection has been made, whereas with my invention, the resistance to rotation to effect a wrench-tight full make-up connection is a true indication that a perfect fluid seal connection has been made.

Another object is the provision of a tapered thread connection wherein the resistance to rotation results only from making a penetrating sealing engagement between the crest and root portions of the thread to seal off any helical clearance therebetween and the making of a flanking sealing engagement between the side surfaces of the threads.

Another object is the provision of a tapered thread connection wherein there is nothing to interfere with the making of the penetrating sealing engagement and the flanking sealing engagement wherein the combined resistance to rotation in making the penetrating sealing engagement and the flanking sealing engagement gives a true indication to the operator that a fluid-tight connection has been made.

Other objects and a fuller understanding of my invention may be had by referring to the following description and claim, taken in conjunction with the accompanying drawing, in which:

Figure 1:
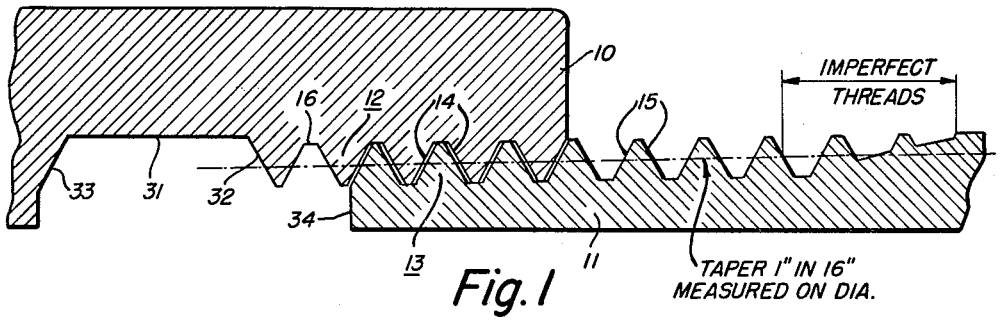
FIGURE 1 is an enlarged cross-sectional view showing only the cross-section of a male body member and a female body member embodying the features of my invention, the relationship between the male and female members being shown in their hand-tight make-up connection.

With reference to the drawing, my tapered thread fluid seal connection comprises a female threaded member 10 and a male threaded member 11 having internal and external engaging threads 12 and 13, respectively, formed on substantially the same taper and with substantially the same pitch. The female threads have V-shaped side surfaces 14 and the male threads have V-shaped side surfaces 15. The female V-shaped side surfaces 14 at their root diameter are spaced apart and interconnected by a root truncation surface 16. The female V-shaped side surfaces 14, if extended beyond their root truncation surface 16 to a theoretical edge 17, would define with said truncation surface 16 a helical triangular section 18 (see FIGURE 3). Similarly, the male V-shaped side surfaces 15 at their root diameter are spaced apart and interconnected by a root truncation surface 19. The male V-shaped side surfaces 15, if extended beyond their root truncation surfaces 19 to a theoretical edge 20, would define with said root truncation surface 20 a helical triangular section 21. The female root truncation surface 16 and the male root truncation surface 19 are identical with each other and the respective helical triangular sections 18 and 21 are likewise identical.

The female V-shaped side surfaces 14 at their crest diameter are spaced apart and interconnected by a crest truncation surface 25. Similarly, the male V-shaped side surfaces 15 at their crest diameter are spaced apart and interconnected by a crest truncation surface 26. The crest truncation surfaces 25 and 26 are identical. The crest truncation surfaces 25 and 26 have a width less than that of the root truncation surfaces 16 and 19. The difference in width is in the order of a few thousandths of an inch, which also means that the spacing between the flanking sides of the male and female threads is in the order of a few thousandths of an inch in the hand-tight make-up condition.

The crest truncation surface 25 for the female threads, being less in width than the root truncation surface 19 for the male threads, thereby forms a helical penetrating portion 27 for the female threads. The crest truncation surface 26 for the male threads, being less in width than the root truncation surface 16 for the female threads, thereby forms a helical penetrating portion 28 for the male threads. The helical penetrating portions 27 and 28 for the female and male threads, respectively, are identical.

The female V-shaped side surfaces 14 have an included angle 29 which is the same as the angle 30 between the male V-shaped side surfaces 15. The crest truncation surface 26 on the male threads has a greater radial dimension than that of the root truncation surface 16 on the female threads, and the crest truncation surface 25 on the female threads has a smaller radial dimension than that of the root truncation surface 19 on the male threads, whereby when the male and female threads are screwed together, the crest truncation surfaces penetrate the root truncation surfaces to seal off any helical clearance therebetween.

The female threaded member 10 has an enlarged internal annular wall defining a recess 31 at the small diameter end of the female threads. The recess 31 has annularly disposed end walls 32 and 33 preferably made on the same angle as the angle of the side wall of the female threads. The recess 31 eliminates the imperfect female threads occurring at the small diameter end thereof and leaves only full-size threads of a predetermined number. In the drawing, the predetermined number of female threads is shown as five full threads, but in actual practice the predetermined number of female threads may range from four to six threads.

The crest and root truncation surfaces are of such size as to engage each other and resist relative rotation therebetween to effect a hand-tight make-up connection before the V-shaped side surfaces of the male and female threads make a full flanking sealing engagement with each other and before the small diameter end 34 of the male threaded member reaches the recess 31. The hand-tight make-up connection is shown in FIGURE 1 and the male threads are engaging the female threads to an extent less than said predetermined number. In other words, the resistance to rotation to effect the hand-tight make-up connection is effected solely by the interengagement of the crest and root truncation surfaces.

Figure 2:
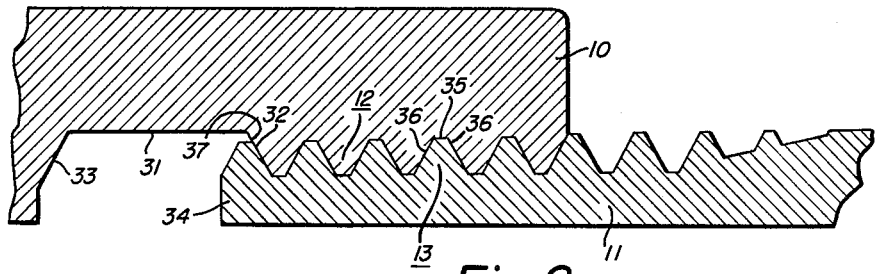
FIGURE 2 is a view similar to FIGURE 1 wherein the male and female members are shown in their wrench-tight full make-up connection.

The recess 31 has an internal diameter to receive the small diameter end 34 of the male threaded member as said female and male members are rotated to wrench-tight full make-up connection. The rotation of the male and female threaded members from the hand-tight make-up connection, as shown in FIGURE 1, to the wrench-tight full make-up connection, as shown in FIGURE 2, forces the helical penetrating portions 27 and 28 to embed themselves into the helical triangular sections 18 and 21, respectively, to make a penetrating sealing engagement with each other and to seal off any helical clearance therebetween before bringing the female and male side surfaces 14 and 15 together to effect a flanking sealing engagement therebetween. The penetrating sealing engagement is illustrated by the reference character 35 in FIGURE 2 and the flanking sealing engagement is illustrated by the reference character 36 in FIGURE 2.

The penetrating sealing engagement 35 and the flanking sealing engagement 36 constitute the only resistance to rotation of the male and female members to effect the wrench-tight full make-up connection.

From the above description, it is to be noted that in my invention the relationship and size of the male and female threads are such as to insure that the crest and root portions of the threads are forced to make a penetrating sealing engagement with each other to seal off any helical clearance therebetween before the threads effect a flanking sealing engagement between the sides. It is further to be noted in my invention that the imperfect threads of the female members are removed by the presence of the recess 31 and this insures that resistance to rotation from a hand-tight make-up connection to a wrench-tight full make-up connection is effected only by engagement of full-size male and female threads with each other, thereby eliminating any possible resistance to rotation which might have been created by engagement of the male threads with imperfect female threads.

Furthermore, in my invention, the relationship and size of the male and female threads are such that the torque resistance to rotation incident to the forcing of the crest and root portions of the threads together to make a penetrating sealing engagement with each other to seal off any helical clearance therebetween is less than the turning force of the operator. In other words, the operator can always turn the male and female members relative to each other to overcome resistance to rotation caused by the crest and root portions being forced against each other.

My invention further reduces the possibility of human error in making a perfect fluid seal connection in that the operator when turning prior art male and female members together may stop short of making a perfect fluid seal connection because the resistance to rotation which might be created by the engagement of the male threads with imperfect female threads to effect a wrench-tight full make-up connection may give the operator a false indication that a true fluid seal connection has been made, whereas with my invention the resistance to rotation to effect a wrench-tight full make-up connection is a true indication that a perfect fluid seal connection has been made. Since the imperfect female threads have been removed by the recess 31, the resistance to rotation results only from making a penetrating sealing engagement between the crest and root portions of the thread to seal off any helical clearance therebetween and the making of a flanking sealing engagement between the side surfaces of the threads. With the same turning torque between my invention and the prior art, the radial force between the male and female threads is much greater, thus giving a much greater sealing action with the same turning torque. Proportionably, the radial force becomes increasingly greater, the farther the small diameter end 34 of the male threads enter the recess 31. Thus, for example, when two full male threads have entered the recess 31, the radial force between the male and female threads would be increased forty percent over the same situation without the recess. Accordingly, the resistance to rotation which results in my invention is a true indication to the operator that a fluid-tight connection has been made, and normally the same operator would tend to make a tighter fluid seal connection with my invention than with prior art connections.

The width of the root and crest truncation surfaces depend upon the size or pitch of the threads. For 27 threads per inch, the root truncation surface may be approximately .006 inch long (maximum) and .004 inch long (minimum); for 18 and 14 threads per inch, the maximum may be .007 inch and the minimum .005 inch; for 11½ threads per inch, the maximum may be .009 inch and the minimum .006 inch; and for 8 threads per inch, the maximum may be .011 inch and the minimum .008 inch. For 27 threads per inch, the crest truncation surface may be approximately .004 inch long (maximum) and .002 inch long (minimum); for 18 and 14 threads per inch, the maximum may be .005 inch and the minimum .003 inch; for 11½ threads per inch, the maximum may be .006 inch and the minimum .004 inch; and for 8 threads per inch the maximum may be .008 inch and the minimum .006 inch.

Figure 3:
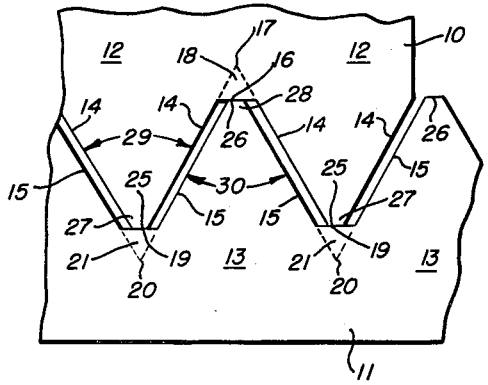
FIGURE 3 is an enlarged outline view of a portion of the male and female threaded members in FIGURE 1.

FIGURE 3 is an enlarged view of a portion of the male and female threaded members of FIGURE 1, showing the hand-tight full make-up connection. In this FIGURE 3 the side clearance between the V-shaped side surfaces of the male and female threads is shown substantially equally divided on both sides of the threads, being a theoretical condition of a balanced static handtight make-up connection. This static condition is to be distinguished from an active threading condition which exists when the male and female threads are being screwed together. In the active threading condition where the axial tension between the male and female members exceeds the axial compression, the male and female threads flank on one side (rearward) leaving a clearance on the forward side and, conversely, when the axial compression exceeds the axial tension, the male and female threads flank on the opposite side (forward) leaving a clearance on the rearward side. As set forth hereinabove in the specification, the respective widths of the root and crest truncation surfaces show that the crest truncation surface has a width less than the root truncation surface by an amount comprising a distance of about .002 to .003 of an inch. Accordingly, the side clearance between the threads will be about the same order, namely a few (2 to 3) thousandths of an inch. In FIGURE 3, the side clearance which is shown on both sides of the threads is greatly exaggerated for purposes of clarity.

Since the differences in width between the crest and the root truncation surfaces are in the order of a few thousandths of an inch, the operator can always turn the male and female members together with a wrench and easily overcome the turning resistance incident to the making of the penetration sealing engagement. It is, however, the turning resistance incident to the making of the flanking sealing engagement between the sides of the thread that finally stops the operator from turning the members together to make a wrench-tight full make-up connection. Therefore, in my invention, the machine tolerance for the root and crest dimensions can always be made heavy with the assurance that the crest and root truncation surfaces will engage each other before the side surfaces engage each other. This assurance is lacking in the prior art.

When the crest truncation surface of the leading thread of the male threaded member breaks through the laterally extending wall 32 or enters the recess 31, as at the reference character 37, there is a tendency for the metal of the root truncation surface of the female member to flow towards the recess, or lip out, and when this lipped-out surface, even though very small, is exposed to high pressure, there is a tendency to produce a pressure-responsive seal condition which aids in producing a high pressure seal connection.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

A tapered pipe thread fluid seal connection comprising, male and female threaded members having respectively male and female threads for effecting a solid mating sealing engagement with each other upon assembly of said members to their wrench-tight full make-up connection, said female threaded member having an enlarged internal annular wall defining a recess at the small diameter end of the female threads, said recess eliminating imperfect female threads normally occurring at the small diameter end thereof and leaving only full-size female threads except for the incomplete thread portion at each end thereof, said male threaded member having full-size male threads disposed for engagement with said full-size female threads, all of said full-size female threads and all of said full-size male threads respectively formed on the same taper and with the same pitch with due variations allowed for manufacturing tolerances, all of said full-size female threads and all of said full-size male threads having full-size V-shaped side surfaces, each full-size V-shaped side surface of all of said full-size female threads and all of said full-size male threads respectively having the same included angle therebetween with due variations allowed for manufacturing tolerances, all of said full-size V-shaped side surfaces at their root diameter being spaced apart and interconnected by a root truncation surface, all of said full-size V-shaped side surfaces if extended beyond said root truncation surface to a theoretical edge would define with said root truncation surface a helical triangular section, said root truncation surface having a maximum width of .006, .007, .007, .009 and .011 of an inch for threads respectively having a pitch of 27, 18, 14, 11½ and 8 threads per inch and having a minimum width of .004, .005, .005, .006 and .008 of an inch respectively for the same said pitch threads with due variations allowed for manufacturing tolerances, all of said full-size V-shaped side surfaces at their crest diameter being spaced apart and interconnected by a crest truncation surface forming a helical penetrating portion, said crest truncation surface having a width less than that of said root truncation surface by an amount comprising a distance of .002 to .003 of an inch with due variations allowed for manufacturing tolerances, said crest truncation surface on said full-size male threads having a greater radial dimension than said root truncation surface on said full-size female threads for the same corresponding longitudinal thread positions which are disposed to coincide with each other at said wrench-tight full make-up connection and said crest truncation surface on said full-size female threads having a smaller radial dimension than said root truncation surface on said full-size male threads for the same corresponding longitudinal thread positions which are disposed to coincide with each other at said wrench-tight full make-up connection, said crest and said root truncation surfaces of all of said full-size threads in mating contact resisting relative rotation therebetween to effect a hand-tight make-up connection before both said full-size V-shaped side surfaces make a full flanking solid mating sealing engagement, said recess having an internal diameter to receive the small diameter end of said male threaded member as said members are rotated to wrench-tight full make-up connection, relative rotation of said male and female threaded members from said hand-tight make-up connection to said wrench-tight full make-up connection forcing said helical penetration portion of all said engaged full-size threads to embed itself into said helical triangular section to make a penetrating solid mating sealing engagement with each other to seal off any helical clearance therebetween before bringing both said full-size V-shaped side surfaces together to effect a full flanking solid mating sealing engagement therewith, all of said full-size female threads and all of said full-size male threads making contact therewith at said wrench-tight full make-up connection having both said penetrating solid mating sealing engagement and said full flanking solid mating sealing engagement and constituting the only resistance to relative rotation of said male and female members at said wrench-tight full make-up connection.

References Cited in the file of this patent
UNITED STATES PATENTS

| | | |
|---|---|---|
| 2,437,638 | Evans | Mar. 9, 1948 |
| 2,567,483 | Hotine | Sept. 11, 1951 |
| 2,992,613 | Bodine | July 18, 1961 |
| 3,083,043 | Thornhill | Mar. 26, 1963 |